US008711928B1

(12) United States Patent
Litvin et al.

(10) Patent No.: US 8,711,928 B1
(45) Date of Patent: Apr. 29, 2014

(54) METHOD, APPARATUS, AND MANUFACTURE FOR ADAPTATION OF VIDEO ENCODER TUNING PARAMETERS

(75) Inventors: Yevgeni Litvin, Nazareth Illit (IL); Eran Pinhasov, Zichron Yaakov (IL)

(73) Assignee: CSR Technology, Inc.

( * ) Notice: Subject to any disclaimer, the term of this patent is extended or adjusted under 35 U.S.C. 154(b) by 449 days.

(21) Appl. No.: 13/253,807

(22) Filed: Oct. 5, 2011

(51) Int. Cl.
*H04N 11/02* (2006.01)

(52) U.S. Cl.
USPC .............. 375/240.03; 375/240.12; 375/240.13

(58) Field of Classification Search
USPC ............................................... 375/240.01–29
See application file for complete search history.

(56) References Cited

U.S. PATENT DOCUMENTS

| | | | |
|---|---|---|---|
| 5,515,377 A | | 5/1996 | Horne et al. |
| 5,719,986 A * | | 2/1998 | Kato et al. ................... 386/329 |
| 5,978,029 A | | 11/1999 | Boice et al. |
| 6,097,757 A | | 8/2000 | Boice et al. |
| 7,023,914 B2 | | 4/2006 | Furukawa et al. |
| 7,106,907 B2 | | 9/2006 | Lin et al. |
| 7,280,700 B2 | | 10/2007 | Tourapis et al. |
| 7,715,475 B1 | | 5/2010 | Puri et al. |
| 8,369,408 B2 * | | 2/2013 | Kim et al. ................ 375/240.16 |
| 2004/0146103 A1 * | | 7/2004 | Chang et al. ............. 375/240.03 |
| 2007/0230565 A1 | | 10/2007 | Tourapis et al. |
| 2010/0054329 A1 * | | 3/2010 | Bronstein et al. ........ 375/240.03 |
| 2010/0086025 A1 * | | 4/2010 | Chen et al. ............... 375/240.03 |
| 2011/0051806 A1 | | 3/2011 | Lee |

OTHER PUBLICATIONS

Ascenso, J. et al., "Content Adaptive Wyner-Ziv Video Coding Driven by Motion Activity," IEEE International Conference on Image Processing, Oct. 8-11, 2006, pp. 605-608.

* cited by examiner

*Primary Examiner* — Dave Czekaj
*Assistant Examiner* — Leron Beck
(74) *Attorney, Agent, or Firm* — Frommer Lawrence & Haug LLP; John W. Branch

(57) ABSTRACT

A method, apparatus, and manufacture for encoding a video sequence is provided. During a first exploitation phase of an encoding pass of the video encoding, macro-blocks are encoded employing at least one encoding parameter. At least one encoder statistic is evaluated based on the encoding of macro-blocks during the first exploitation phase. Next, during a first exploration phase of the encoding pass, macro-blocks are encoded employing at least one encoding parameter that is different than the encoding parameter(s) used during the first exploitation phase. At least one encoder statistic is evaluated based on the encoding of the macro-blocks during the first exploitation phase. The encoder statistic(s) based on the first exploration stage is compared when the encoder statistic(s) based on the first exploitation phase, and a steady-state value of the encoding parameter(s) is updated based on the comparison. The process may then continue to alternate between exploration and exploitation phases.

12 Claims, 6 Drawing Sheets

METHOD, APPARATUS, AND MANUFACTURE FOR ADAPTATION OF VIDEO ENCODER TUNING PARAMETERS

TECHNICAL FIELD

The invention is related to video encoding, and in particular, but not exclusively, to a method, apparatus, and manufacture for video encoding in which tuning parameters of the encoder are continuously updated during an encoding pass based on statistics estimated from the encoded video sequence such that the encoder performance improves over time during the encoding pass.

BACKGROUND

Most video coding algorithms, including H.264\AVC video coding standard, use temporal redundancy of images in consequent frames to reduce size of coded bit-stream. In these algorithms, where the Reference frame is a previously coded frame and Target frame is a frame being currently coded, only the residual (i.e. difference) between reference and target frame is typically coded. Often, a video scene contains moving objects, and in order to minimize the residual between target and reference images, a motion estimation (ME) process may be used in order to find better match between target and reference images.

BRIEF DESCRIPTION OF THE DRAWINGS

Non-limiting and non-exhaustive embodiments of the present invention are described with reference to the following drawings, in which.

DETAILED DESCRIPTION

Figure 1:
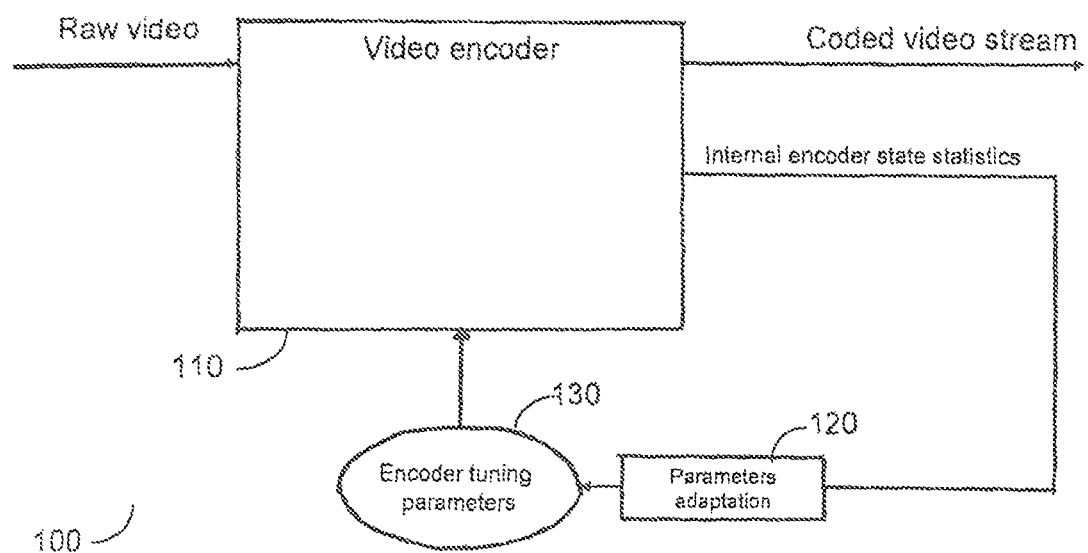
FIG. 1 illustrates a functional block diagram of an embodiment of a device.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "signal" means at least one current, voltage, charge, temperature, data, or other signal.

Briefly stated, the invention is related to a method, apparatus, and manufacture for encoding a video sequence. In some embodiments, during a first exploitation phase of an encoding pass of the video encoding, macro-blocks are encoded employing at least one encoding parameter. At least one encoder statistic is evaluated based on the encoding of macro-blocks during the first exploitation phase. Next, during a first exploration phase of the encoding pass, macro-blocks are encoded employing at least one encoding parameter that is different than the encoding parameter(s) used during the first exploitation phase. At least one encoder statistic is evaluated based on the encoding of the macro-blocks during the first exploitation phase. The encoder statistic(s) based on the first exploration stage is compared to the encoder statistic(s) based on the first exploitation phase, and a steady-state value of the encoding parameter(s) is updated based on the comparison. The process may then continue to alternate between exploration and exploitation phases in some embodiments.

FIG. 1 illustrates a functional block diagram of an embodiment of device 100. Device 100 includes video encoder 110, parameters adaptation 120, and encoder tuning parameters 130.

Video encoder 110 is arranged to receive video (e.g., raw video) as an input and to provide a coded video stream as an output. Video encoder 110 is further arranged to provide statistics of its internal state or the statistics of the coded video stream, respective of the coded video stream. Different video sequences have different statistical properties. These include, but are not limited to, smoothness of a frame, fast or slow motion, statistics related to the R-D (rate-distortion) performance of the video being encoded, and/or the like. These encoder statistics may include, for example, consumed bits or predictor for bit-cost. The encoder statistics may include one or more measures of objective quality, including, for example:

a. SAE—sum of absolute error
b. MSE—mean square error
c. MAE—mean absolute error
d. PSNR—peak signal to noise ratio
e. SSIM—structural similarity index
f. SSE—sum of square difference
g. SAD—sum of absolute difference These encoder statistics may be used to measure the difference between part or all of the picture, between that part of the picture before encoding and after encoding. The statistics of quality may be derived from portions of the video of variety of different sizes in various embodiments, such as individual macro-blocks in some embodiments, and multiple frames in other embodiments. The encoder statistics may also include the percentage of interim blocks, the number of bits sent encoding motion vectors compared to the number of bits sent encoding the residual, the percentage of different partitioning modes during the encoding, the difference between maximum and minimum levels of luminance or chrominance, variance in the level values in different blocks, and/or the like.

Video encoder 110 is arranged to provide one or more encoder statistics estimated from the encoded video sequence.

Parameter adaptation block 120 is arranged to receive the one or more statistics estimated from the encoded video sequence provided by video encoder 110, and to change the encoder tuning parameters 130 during the encoding process. Encoders perform many decisions, aiming for maximum quality and minimum bit-rate. These decisions are controlled by multiple parameters. Some example of encoder parameters may be a preference of the encoder to use different coding modes (e.g. partitioning type, skip decision, and/or the like). Parameter adaptation block 120 is arranged to change at least one of these parameters; the parameters that parameter adaptation block 120 changes are labeled encoder tuning parameters 130.

For example, in some embodiments, encoding tuning parameters 130 may include a weight controlling a preference of the encoder to code a macro-block as skip. In some embodiments, encoding tuning parameters 130 may include a weight controlling a preference of the encoder to encode a macro-block in a certain partitioning mode, such as single, double, or more partitions of motion block vectors. Scenes including many small moving objects would benefit from more partitions. In other embodiments, encoding turning parameters 130 may include a weight controlling a preference to employ inter-encoding or intra-encoding. Unlike inter-encoding, intra-encoding makes use of only special redundancies, and does not need the previous frame of the next frame, whereas inter-encoding also makes use of temporal redundancies.

Various embodiments may also include parameters such as a weight controlling a preference to code a macro-block as direct (or to another particular prediction mode, such as Forward, Backward, Bi-directional, and/or the like), a scale and/or offset used for penalization of distortion relative to rate during motion-estimation process, a weight controlling a preference to select frame type, and/or a weight affecting a quantizer value. In some embodiments, the encoding parameter(s) may include A threshold on prediction error relative to previous frame (e.g. SAD) below which a MB will be encoded as Skip. In some embodiments, the encoding parameter(s) may include a relative penalty added to Intra coding mode during the decision between Inter or Intra coding for a MB, e.g. if (Inter_Cost>Intra_Cost*A) do Intra where A is the relative penalty running between values of 1 to 2 (e.g., 1.2 gives 20% penalty to Intra coding). In some embodiments, the encoding parameter(s) may include a scale value used for calculating the penalty of motion-vector relative to SAD (for doing rate-distortion optimization during ME), e.g., Cost_of_MB=SAD+scale*Motion_Vector_Difference.

These embodiments and others are included within the scope and spirit of the invention.

Parameter adaptation block 120 may use different methods for adapting current encoding tuning parameters 130 that optimally suit the currently encoded video stream. For example, and without limitation, algorithms from reinforcement learning theory, control theory, and/or other appropriate fields, may be used, or otherwise adapted, to enable such parameter adaptation.

In various embodiments, the operation of parameter tuning is done during image compression e.g. at Macro-Block (MB) level, or per several MBs, at frame level, or per several frames. Parameter adaptation block 120 is arranged to adjust the encoder parameters 130 around the current working point and look for an improved state in the rate-distortion space (e.g., checking if the new state gives less bits for similar quality). Using this iterative method the encoder efficiency may be improved by adapting encoding tuning parameters 130 to the current scene.

In some embodiments, the algorithm performed by parameter adaptation block 120 may make use of two different modes: exploration phase and exploitation phase. Exploration phase is a period in time when the encoder tries different values of at least a parameter in order to find a better value. Exploitation phase is a period in time when the encoder operates using a previously found value of at least a parameter.

In some embodiments, all of the video encoding is performed with a single encoder and a single encoding pass. During that single encoder pass employing a single encoder, the encoder alternates between exploitation phase and exploration phase while encoding the video, adaptively adjusting the value of the encoding parameter(s) in real time while encoding the video during the single encoding pass. In some embodiments, the first phase of the video encoding may be an exploitation phase in which initial value(s) for the encoding parameter(s) are employed. During the exploitation phases, the steady-state values of the encoding parameter(s) are used.

During each exploration phase, one or more of the encoding parameter(s) are changed in an attempt to find a better value. In some embodiments, algorithm(s) from the fields of reinforcement learning, control theory, and/or other appropriate fields may be used to generate intelligent value(s) to be tested during the next exploration phase based on the results of the previous encoding parameter(s) that have been tested. At the end of each exploration phase, a determination is made as to whether or not the values for the encoding parameter(s) tested during the exploration phase are better than the steady-state value (based on the encoding statistic(s)). If the values of the encoding parameter(s) tested during the exploration phase are better than the steady-state value(s), then the old steady-state values of the encoding parameter(s) are replaced with the encoding parameter value(s) used during the exploration phase.

In some embodiments, the alternation between the exploitation and exploration phases continues throughout encoding all of the video. As the encoding occurs, the steady-state value should achieve a higher R-D value by reaching more optimal encoding parameter(s) for the video scene that is being encoded. If a new scene should occur which has different optimal value(s) for the encoding parameter(s), then as the new scene is being encoded, the steady-state value(s) of the encoding parameter(s) should achieve a higher R-D value for the new scene by reaching more optimal encoding parameter(s) for the new video scene that is being encoded.

Figure 2:
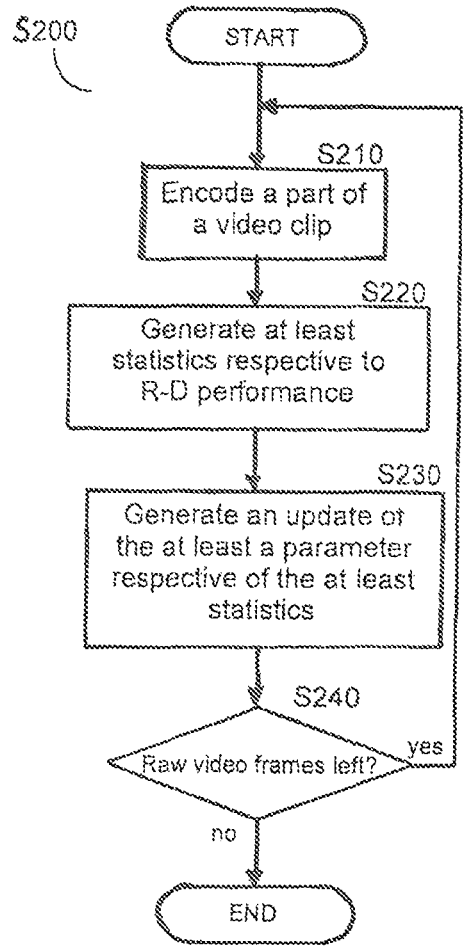
FIG. 2 shows a flowchart of an embodiment of a process that may be employed by an embodiment of the device of FIG. 1.

FIG. 2 shows a flowchart of an embodiment of process S200, which may be employed by an embodiment of device 100 of FIG. 1.

After a start block, the process proceeds to block S210, where at least a portion of a video clip is encoded by a video encoder, for example video encoder 110 of FIG. 1, employing at least a parameter of the video encoder.

The process then advances to block S220, where the video encoder generates statistic(s) respective of the R-D performance for the encoded portion of the video clip. The process then moves to block S230, where an update of the at least a parameter takes place with respect of the statistic(s) generated by the video encoder.

The process then proceeds to decision block S240, where a determination is made as to whether additional frames of raw video are to be encoded, and if so, execution continues with S210. Otherwise, the process moves to a return block, where other processing is resumed.

Prior to discussing and explaining how certain particular embodiments operate in greater detail, it may be of interest to first discuss how an image and/or sequence of images may be received and prepared for processing in one embodiment.

Figure 3:
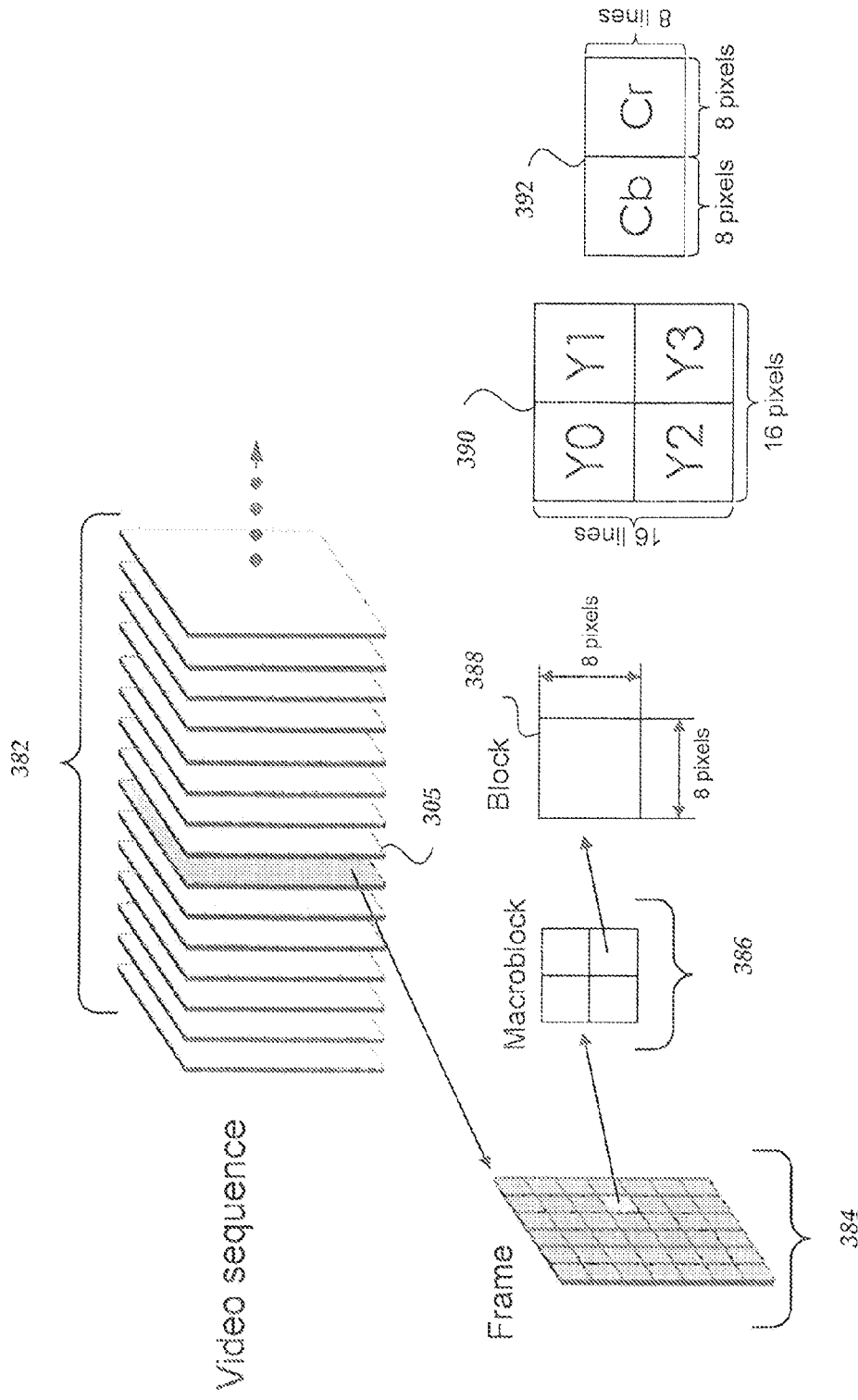
FIG. 3 illustrates a non-limiting, non-exhaustive representation of a video sequence of images.

FIG. 3 illustrates a non-limiting, non-exhaustive representation of a video sequence of images. In one embodiment, the video sequence may include a plurality of frames 382, each frame representing a single capture of a picture or image of some scene. The sequence of images represents 'changes' of the image over time. Thus, for example, frame 384 may represent the image at one time, while frame 385 may represent the image at a second different time, although this is not required.

Frames within the plurality of frames 382 may be coded using any of a variety of mechanisms including those defined by the Joint Video Team (JVT) of the ISO/IEC Moving Picture Expert Group (MPEG) and the ITU-T Video Coding Experts (VCEG). However, it should be understood that embodiments discussed within are not constrained to a particular type of coding mechanism, and any of a variety of other formats, standards, or the like, may also be used. In any event, as shown, frame 384 (or any other frame) may be divided into a set of pixel arrays, such as 16×16 pixels in size, and each pixel array may then be termed a Macro-Block (MB), such as MB 386. It should be recognized that other pixel array sizes may also be employed, including for example, 8×8, 64×64, or even pixel arrays where a number of rows are different from a number of columns within the pixel array. In any event, as is further illustrated in FIG. 3, each MB 386 may be further divided into a plurality of sub-blocks. As shown, one non-limiting example of a sub-block, Block 388, illustrates that MB 386 is divided into four sub-blocks, each of 8×8 pixels. However, other sizes of sub-blocks may also be selected.

In one embodiment, the plurality of frames 382 may be obtained from an analog source, and be represented by red (R), green (G), and blue (B) lines that may be converted into color difference components using, for example, various processes. For example, in one embodiment, such color difference components may be obtained based on the Rec. 601 (formally known as the CCIR-601) component color television standard from the International Telecommunication Union (ITU) Radio communication Sector (ITU-R). However, any of a variety of other techniques may also be employed, and embodiments are not constrained to a particular standard, or format. In any event, by way of example only, the image data may be defined by three components of the image signal; namely, a luminance component (Y), and two complementary chrominance components (V=R−Y) and (U=B−Y). For three dimensional or higher dimensional images, and/or other types of image representations, other components may also be included.

In any event, in this example, each image sub-block (block 388) may be formed of a given number of pixels of the image. A Y block 390, may comprise 16 pixels horizontally and 16 lines of pixels vertically, where the image data includes a color signal, then the image sub-blocks (block 388) further include color information in the form of chrominance components, Cb and Cr, where Cb and Cr are the blue-difference (U) and red-difference (V) components, respectively. Each of the color components may be represented by respectively superimposed color blocks 392.

Various mechanisms may be employed to convert the RGB data signals into color difference components, including for example using a matrix circuit to provide the luminance (Y), and chrominance (Cb, Cr) component signals. In one embodiment, the luminance component and the chrominance components may be received as analog signals that are provided to respective low pass (or equal bandwidth) filters and passed through analog-to-digital converters, to generate a digital data format. In one embodiment, the filtered and digitized luminance and chrominance components may be supplied to a block forming circuit, in one embodiment, where the described image blocks may be formed.

The plurality of frames 382 described above and in FIG. 3 may then be subsequently provided to a video encoder (e.g., video encoder 156 of FIG. 1) to perform video encoding. Herein, the word "picture" is used in some cases rather than frame, since a picture may be a frame (e.g., in the case of progressive video) or a field (e.g., in the case of interlaced video).

Figure 4:
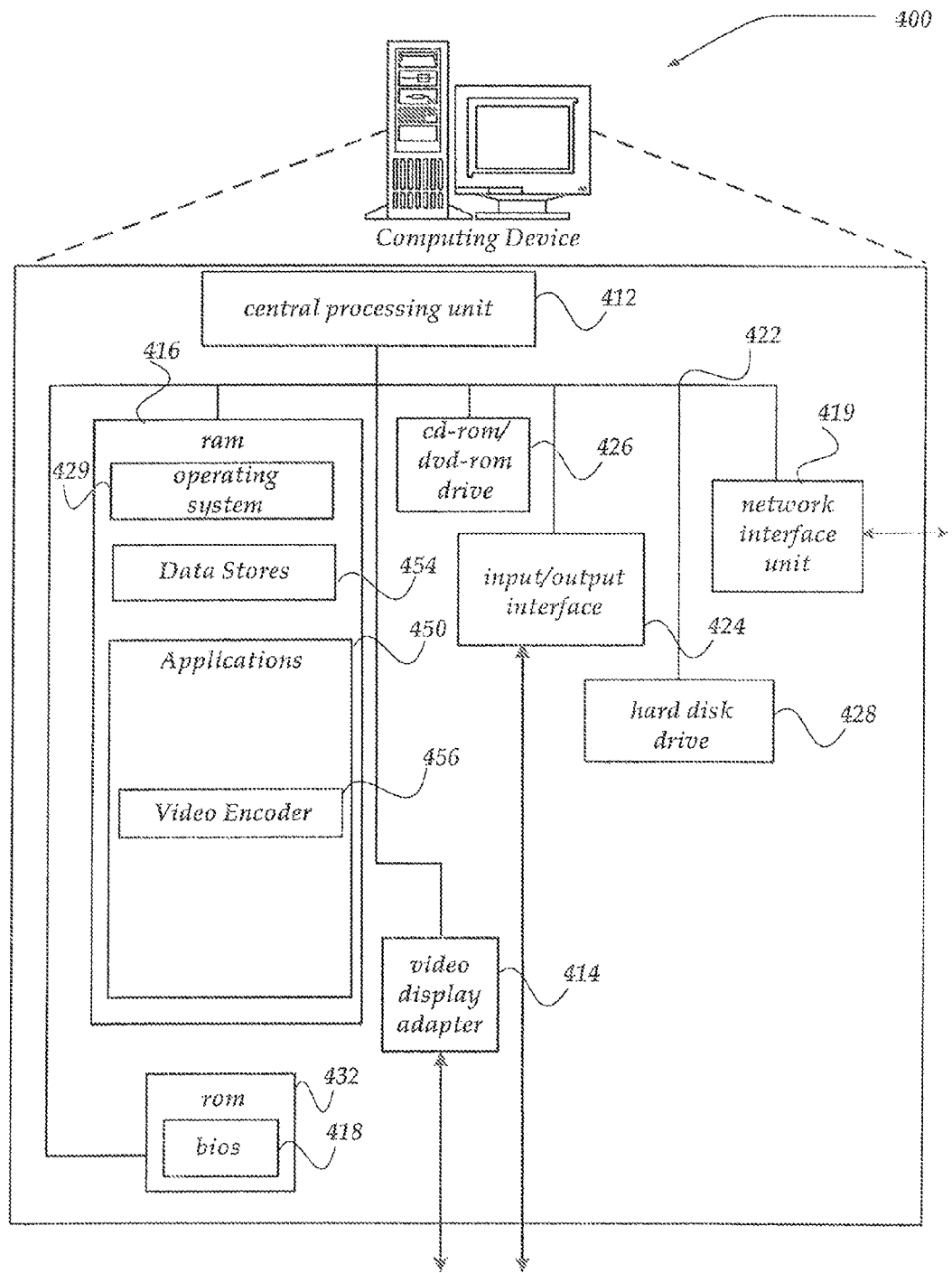
FIG. 4 shows block diagram of an embodiment of a device that may be employed as an embodiment of the device of FIG. 1.

FIG. 4 shows one embodiment of computing device 400, according to one embodiment of the invention. Computing device 400 may include many more or less components than those shown. The components shown, however, are sufficient to disclose an illustrative embodiment for practicing the invention.

Computing device 400 includes processing unit 412, video display adapter 414, and a mass memory, all in communication with each other via bus 422. The mass memory generally includes RAM 416, ROM 432, and one or more permanent mass storage devices, such as hard disk drive 428, tape drive, optical drive, and/or floppy disk drive. The mass memory stores operating system 429 for controlling the operation of computing device 400. Any general-purpose operating system may be employed. Basic input/output system ("BIOS") 418 is also provided for controlling the low-level operation of computing device 400. Some embodiments of computing device 400 also can communicate with the Internet, or some other communications network, via network interface unit 419, which may be constructed for use with various communication protocols including the TCP/IP protocol. Network interface unit 419 is sometimes known as a transceiver, transceiving device, or network interface card (NIC).

The mass memory as described above illustrates another type of computer-readable/processor-readable media, namely computer-readable storage media. Computer-readable storage media (devices) may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

As shown, data stores 454 may include a database, text, spreadsheet, folder, file, or the like, that may be configured to maintain and store user account identifiers, user profiles, email addresses, IM addresses, and/or other network addresses; or the like. Data stores 454 may further include program code, data, algorithms, and the like, for use by a processor, such as central processing unit (CPU) 412 to execute and perform actions. Data stores 454 may include video files, and/or the like. In one embodiment, at least some of data and/or instructions stored in data stores 454 might also be stored on another device of computing device 400, including, but not limited to cd-rom/dvd-rom 426, hard disk drive 428, or other computer-readable storage device resident on computing device 400 or accessible by computing device 400 over, for example, network interface unit 419.

The mass memory also stores program code and data. One or more applications 450 are loaded into mass memory and run on operating system 429. Examples of application programs may include video encoder 456, transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. The data may also include video files and/or the like.

Video encoder application 456 is configured to enable encoding video when executed by CPU 412. While encoding video, video encoder 456 may perform various functions discussed herein and/or discussed with regard to steps as illustrated in the flowcharts shown above and below. For example, while encoding video, video encoder 456 may adjust one or more encoding parameters based on one or more encoder statistics, in accordance with one or more of the processes discussed herein. These stored applications, including video encoder 456, are processor-executable code encoded on a processor-readable medium, which, when executed by CPU 412, enable actions to performed in accordance with the processor-executable code.

Figure 5:
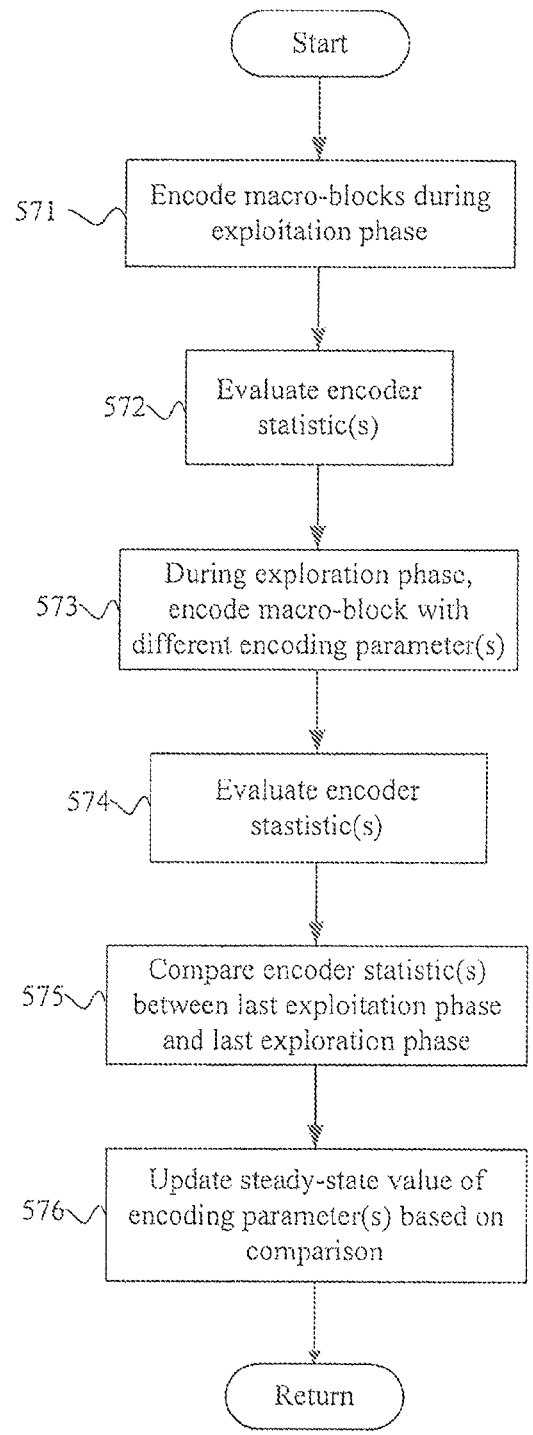
FIG. 5 illustrates a flowchart of an embodiment of a process that may be employed by an embodiment of the device of FIG. 4.

FIG. 5 shows a flowchart of an embodiment of process 500. Process 500 may be employed by an embodiment of computing device 400 by executing video encoder 456. After a start block, the process proceeds to block 571, where, during a first exploitation phase of an encoding pass of the video encoding, macro-blocks are encoded employing at least one encoding parameter. The process then moves to block 572, where at least one encoder statistic is evaluated based on the encoding of macro-blocks during the first exploitation phase.

Next, the process proceeds to block 573, where, during a first exploration phase of the encoding pass, macro-blocks are encoded employing at least one encoding parameter that is different than the encoding parameter(s) used during the first exploitation phase. The process then moves to block 574, where at least one encoder statistic is evaluated based on the encoding of the macro-blocks during the first exploration phase. The process then advances to block 575, where the encoder statistic(s) based on the first exploration stage is compared when the encoder statistic(s) based on the first exploitation phase. The process then proceeds to block 576, where a steady-state value(s) of the encoding parameter(s) is updated based on the comparison. The process then moves to a return block, where other processing is resumed.

Although FIG. 5 shows only one exploitation phase and one exploration phase, the process may continue to alternate between exploitation phases and exploration phases, all occurring in the same encoding pass. During each exploitation phase, a number of macro-blocks are encoded using the steady-state value(s) of the encoding parameter(s). During each exploration phase, a new value(s) of the encoding parameter(s) is employed, and macro-blocks are encoded using the new parameter(s). The encoder statistic(s) during the exploration phase are evaluated, and compared with the encoder statistic(s) associated with the steady-states value(s) of the encoding parameter(s). The steady-state value(s) of the encoding parameter(s) are updated based on the comparison. In some embodiments, these phases alternate continuously all throughout the video encoding.

Figure 6:
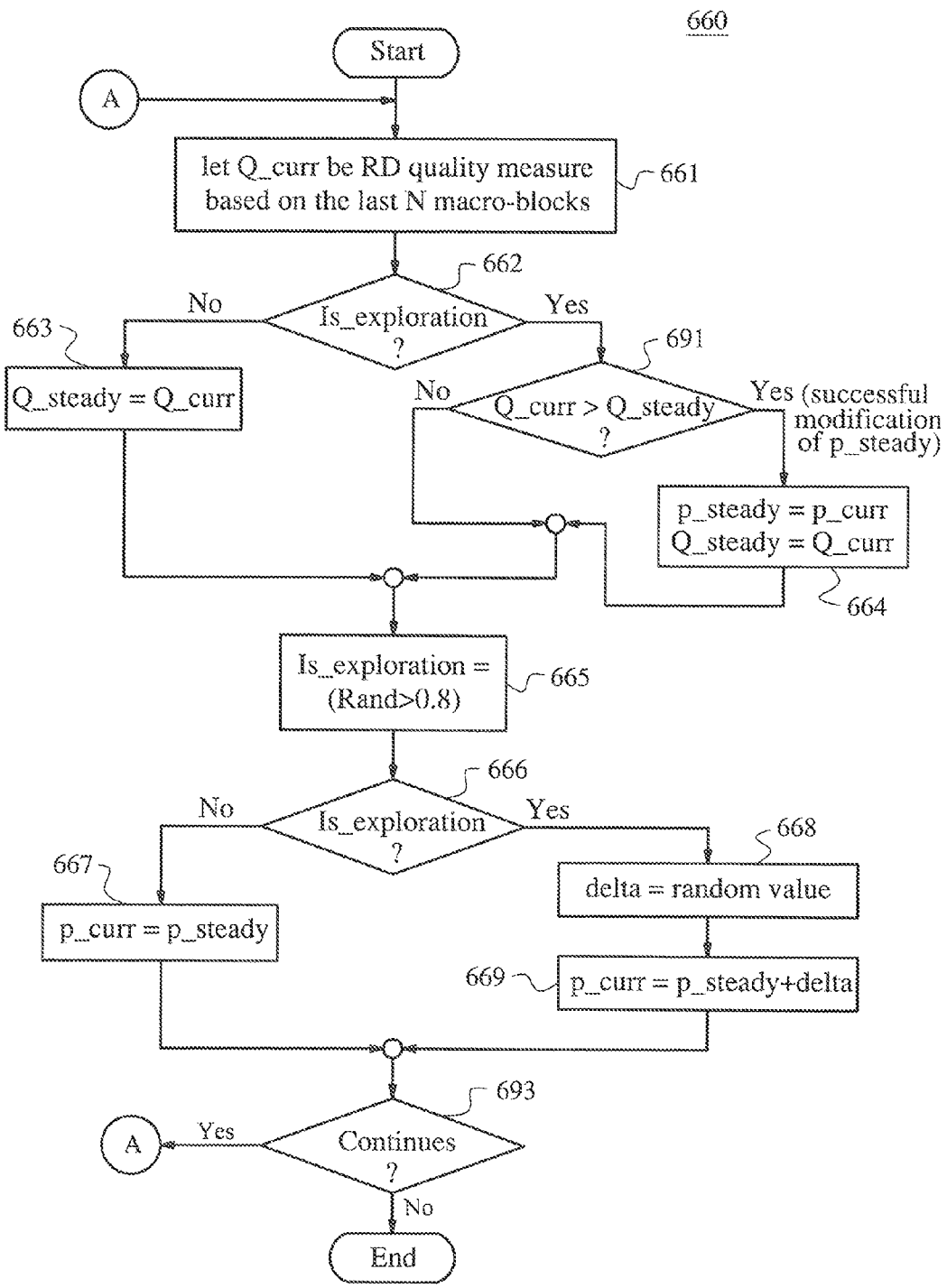
FIG. 6 shows a flowchart of an embodiment of a process that may be employed as an embodiment of the process of FIG. 5, in accordance with aspects of the invention.

FIG. 6 shows a flowchart of an embodiment of process 660, which may be employed as an embodiment of process 570 of FIG. 5. The following variables are used in the description of FIG. 6:

p_steady—is a value of at least a parameter that is used by the algorithm, except for coding in the exploration phase;

Q_steady—a R-D quality measure estimated during exploitation phase; and, is_exploration—true if the encoder is in exploration phase, false if the encoder is in the exploitation phase.

At a start block, an initialization is performed. In one embodiment, the initialization is as follows. Variable p_steady is initialized to some initial value, for example found as a result of offline tuning. Variable Q_steady is initialized to some minimal possible value. Variable is_exploration is initialized to false.

After the start block, the process moves to block 661, where N macro-blocks are encoded during an exploitation phase, and where the R-D quality measure is calculated based on the data for the last N macro-blocks resulting in the value Q_curr. In one embodiment, N is ten. However, the invention is not so limited, and other suitable of N are employed in various other embodiments of the invention. In various embodiments of the invention, different values of N may be more suitable for different types of statistics being collected. The process then proceeds to block 662, where a determination is made as to whether the system is in the exploration phase (is_exploration=true). If so, the process advances to decision block 691. Otherwise, the process proceeds to block 663, where Q_steady is updated to the current quality (Q_curr).

At decision block 691, a determination is made as to whether or not Q_curr is greater than Q_steady. If it is determined that the current RD quality (Q_curr) is greater than Q_steady, then exploration was successful the processing proceeds to block 664, where p_steady is updated to p_curr and Q_steady is updated to Q_curr. Processing then proceeds to block 665. Alternatively, if the determination at decision block 691 is negative, steady values (Q_steady and p_steady) remain unchanged, and processing proceeds to block 665.

At block 665, the exploration/exploitation mode for the next invocation is determined. At block 665, variable is_exploration is set to true or false depending on whether or not the next invocation is to be in exploitation mode or exploration mode. For example, in some embodiments, whether the next invocation is in exploitation mode or exploration mode is random. For example, in one non-limiting embodiment, the random probability of 20%, where Rand is a function which is set to a random value in the range of [0, 1] with some distribution, e.g. uniform. In other embodiments, the determination is not random, or is random but determined in a different fashion. In some embodiments, the determination is partially random and partially based on non-random factors.

The process then proceeds to decision block 666, where a determination is made as to whether is_exploration is true. If so, the processing advances to block 668 and block 669, where the parameter is updated to a new value, for example using a randomly generated value delta. In various embodiments, the delta may be random or partly random. In some embodiments, generation of delta may include intelligence based on previous attempts. In some embodiments, delta is generally relatively small, but once in several iterations a larger jump in delta may be attempted, for example to avoid local minima or the like. Processing then moves to decision block 693.

If the determination at decision block 666 is negative, the processing moves to block 667, where p_curr is made equal to p_steady. Processing then proceeds to decision block 693, where a determination is made as to whether or not to continue execution. If so, the process proceeds to decision block 661. Otherwise, the process proceeds to a return block, where other processing is resumed.

In some embodiments, more than one parameter may be adjusted at a time. In some cases, the multiple parameters may be of a multidimensional function that is not necessarily separable. For example, in some embodiments, adjustment of the parameters is accomplished so as to change several parameters to go in a direction of maximal descent. In some embodiments, the selection of the direction may improve over several steps while the algorithm learns the shape of the optimized function. For example, if the function is quadratic, the algorithm would converge faster by, rather than adjusting the parameters as a linear function, assuming a parabolic shape of the function around current point and trying to discover a parabolic approximated shape in iterative steps (e.g., Quasi-Newton approach).

Process 660 allows the video encoding to achieve a higher R-D quality of the coded video stream, allowing one or both of, 1) storing larger amounts of video on a storage device, e.g., SD card, while maintaining or improving video quality, or 2) storing video clips of higher visual quality using the same or smaller amount of storage.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A method, comprising:
    encoding a video sequence, including, within an encoding pass:
        during a first exploitation phase of the encoding pass, encoding a first plurality of macro-blocks employing a first set of values of a set of at least one encoding parameter;
        evaluating at least one encoder statistic based on the encoding of the first plurality of macro-blocks;
        during a first exploration phase of the encoding pass that is distinct from the first exploitation phase, encoding a second plurality of macro-blocks employing a second set of values for the set of at least one encoding parameter, wherein the second set of values is different than the first set of values;
        evaluating the at least one encoder statistic based on the encoding of the second plurality of macro-blocks;
        comparing the at least one encoder statistic based on the encoding of the first plurality of macro-blocks with the at least one encoder statistic based on the encoding of the second plurality of macro-blocks; and
        updating a steady-state value for each parameter in the set of at least one encoding parameter based on the comparison wherein the encoding of the video sequence is performed such that, within the encoding pass, a plurality of additional exploitation phases and a plurality of exploration phases occur after the first exploitation phase and the first exploration phase, such that during each of the additional exploration phases, a new set of values for the set of at least one encoding parameters is employed, and for each of the additional exploration phases, the at least one encoder statistic is evaluated based on the encoding during the phase, the at least one encoder statistic based on the encoding during the phase is compared with the at least one encoder statistic based on the encoding while employing the steady-state set of encoding parameters, and the steady-state set of values of the at least one encoding parameters is updated based on the most recent comparison, wherein the steady-state set of values of each of the encoding parameters is employing during each of the additional exploration phases; wherein the encoding of the video sequence is further performed such that during each of the additional exploration phases, the new set of values for the set of at least one encoding parameters is determined based on the at least encoder statistics evaluated during each of the previous exploration phases; and wherein the encoding of the video sequence is further performed such that during each of the additional exploration phases, the new set of values for the set of at least one encoding parameters is determined based on at least one of a reinforcement theory algorithm or a control theory algorithm.

2. The method of claim 1, wherein the set of at least one encoding parameter includes at least one of: a weight controlling a preference to code a macro-block as skip, a weight controlling a preference to encode a macro-block in a particular partitioning mode, a weight controlling a preference to employ inter-encoding or intra-encoding, a weight controlling a preference to code a macro-block in a particular prediction mode, a weight controlling a preference to select intra-prediction mode, a scale used for penalization of distortion relative to rate during motion estimation, an offset used for penalization of distortion relative to rate during motion estimation, a weight controlling a preference to select frame type, or a weight affecting a quantizer value.

3. The method of claim 1, wherein the at least one encoding statistic includes at least one of: an objective measure of quality of the video encoding, bits consumed for the encoded video, or a predictor for a bit-cost of the encoded video.

4. The method of claim 1, wherein the encoding of the video sequence is performed such that the first exploration phase occurs immediately after the first exploitation phase, and such that a duration of the first exploitation phase is at least partially random.

5. The method of claim 1, wherein the at least one encoding statistic includes an objective measure of quality of the video encoding.

6. The method of claim 5, wherein the objective measure of quality of the video encoding includes at least one of: a sum of absolute difference between the compensated reference video and the video prior to the encoding, a sum of square difference between the compensated reference video and the video prior to the encoding, a sum of absolute error between the encoded video and the video prior to the encoding, a mean square error between the encoded video and the video prior to the encoding, a mean absolute error between the encoded video and the video prior to the encoding, a peak signal to noise ratio, or a structural similarity index between the encoded video and the video prior to the encoding.

7. An apparatus, comprising:
    a memory that is configured to store processor-executable instructions; and
    a processor that is configured to execute the processor-executable instructions to enable actions, including:

encoding a video sequence, including, within an encoding pass:
during a first exploitation phase of the encoding pass, encoding a first plurality of macro-blocks employing a first set of values of a set of at least one encoding parameter;
evaluating at least one encoder statistic based on the encoding of the first plurality of macro-blocks;
during a first exploration phase of the encoding pass that is distinct from the first exploitation phase, encoding a second plurality of macro-blocks employing a second set of values for the set of at least one encoding parameter, wherein the second set of values is different than the first set of values;
evaluating the at least one encoder statistic based on the encoding of the second plurality of macro-blocks;
comparing the at least one encoder statistic based on the encoding of the first plurality of macro-blocks with the at least one encoder statistic based on the encoding of the second plurality of macro-blocks; and
updating a steady-state value for each parameter in the set of at least one encoding parameter based on the comparison wherein the encoding of the video sequence is performed such that, within the encoding pass, a plurality of additional exploitation phases and a plurality of exploration phases occur after the first exploitation phase and the first exploration phase, such that during each of the additional exploration phases, a new set of values for the set of at least one encoding parameters is employed, and for each of the additional exploration phases, the at least one encoder statistic is evaluated based on the encoding during the phase, the at least one encoder statistic based on the encoding during the phase is compared with the at least one encoder statistic based on the encoding while employing the steady-state set of encoding parameters, and the steady-state set of values of the at least one encoding parameters is updated based on the most recent comparison, wherein the steady-state set of values of each of the encoding parameters is employing during each of the additional exploration phases; wherein the encoding of the video sequence is further performed such that during each of the additional exploration phases, the new set of values for the set of at least one encoding parameters is determined based on the at least encoder statistics evaluated during each of the previous exploration phases; and wherein the encoding of the video sequence is further performed such that during each of the additional exploration phases, the new set of values for the set of at least one encoding parameters is determined based on at least one of a reinforcement theory algorithm or a control theory algorithm.

8. The apparatus of claim 7, wherein
the set of at least one encoding parameter includes at least one of: a weight controlling a preference to code a macro-block as skip, a weight controlling a preference to encode a macro-block in a particular partitioning mode, a weight controlling a preference to employ inter-encoding or intra-encoding, a weight controlling a preference to code a macro-block in a particular prediction mode, a weight controlling a preference to select intra-prediction mode, a scale used for penalization of distortion relative to rate during motion estimation, an offset used for penalization of distortion relative to rate during motion estimation, a weight controlling a preference to select frame type, or a weight affecting a quantizer value.

9. The apparatus of claim 7, wherein
the at least one encoding statistic includes at least one of: an objective measure of quality of the video encoding, bits consumed for the encoded video, or a predictor for a bit-cost of the encoded video.

10. A manufacture, including a non-transitory tangible processor-readable storage medium having processor-executable code encoded therein, which when executed by one or more processors, enables actions, comprising:
encoding a video sequence, including, within an encoding pass:
during a first exploitation phase of the encoding pass, encoding a first plurality of macro-blocks employing a first set of values of a set of at least one encoding parameter;
evaluating at least one encoder statistic based on the encoding of the first plurality of macro-blocks;
during a first exploration phase of the encoding pass that is distinct from the first exploitation phase, encoding a second plurality of macro-blocks employing a second set of values for the set of at least one encoding parameter, wherein the second set of values is different than the first set of values;
evaluating the at least one encoder statistic based on the encoding of the second plurality of macro-blocks;
comparing the at least one encoder statistic based on the encoding of the first plurality of macro-blocks with the at least one encoder statistic based on the encoding of the second plurality of macro-blocks; and
updating a steady-state value for each parameter in the set of at least one encoding parameter based on the comparison wherein the encoding of the video sequence is performed such that, within the encoding pass, a plurality of additional exploitation phases and a plurality of exploration phases occur after the first exploitation phase and the first exploration phase, such that during each of the additional exploration phases, a new set of values for the set of at least one encoding parameters is employed, and for each of the additional exploration phases, the at least one encoder statistic is evaluated based on the encoding during the phase, the at least one encoder statistic based on the encoding during the phase is compared with the at least one encoder statistic based on the encoding while employing the steady-state set of encoding parameters, and the steady-state set of values of the at least one encoding parameters is updated based on the most recent comparison, wherein the steady-state set of values of each of the encoding parameters is employing during each of the additional exploration phases; wherein the encoding of the video sequence is further performed such that during each of the additional exploration phases, the new set of values for the set of at least one encoding parameters is determined based on the at least encoder statistics evaluated during each of the previous exploration phases; and wherein the encoding of the video sequence is further performed such that during each of the additional exploration phases, the new set of values for the set of at least one encoding parameters is determined based on at least one of a reinforcement theory algorithm or a control theory algorithm.

11. The manufacture of claim 10, wherein
the set of at least one encoding parameter includes at least one of: a weight controlling a preference to code a macro-block as skip, a weight controlling a preference to encode a macro-block in a particular partitioning mode, or a weight controlling a preference to employ inter-encoding or intra-encoding.

12. The manufacture of claim 10, wherein
the at least one encoding statistic includes at least one of: an objective measure of quality of the video encoding, bits consumed for the encoded video, or a predictor for a bit-cost of the encoded video.

\* \* \* \* \*